Dec. 18, 1928.

D. HEAD 1,695,426

AIR CONDITIONER

Filed Jan. 3, 1927     2 Sheets-Sheet 1

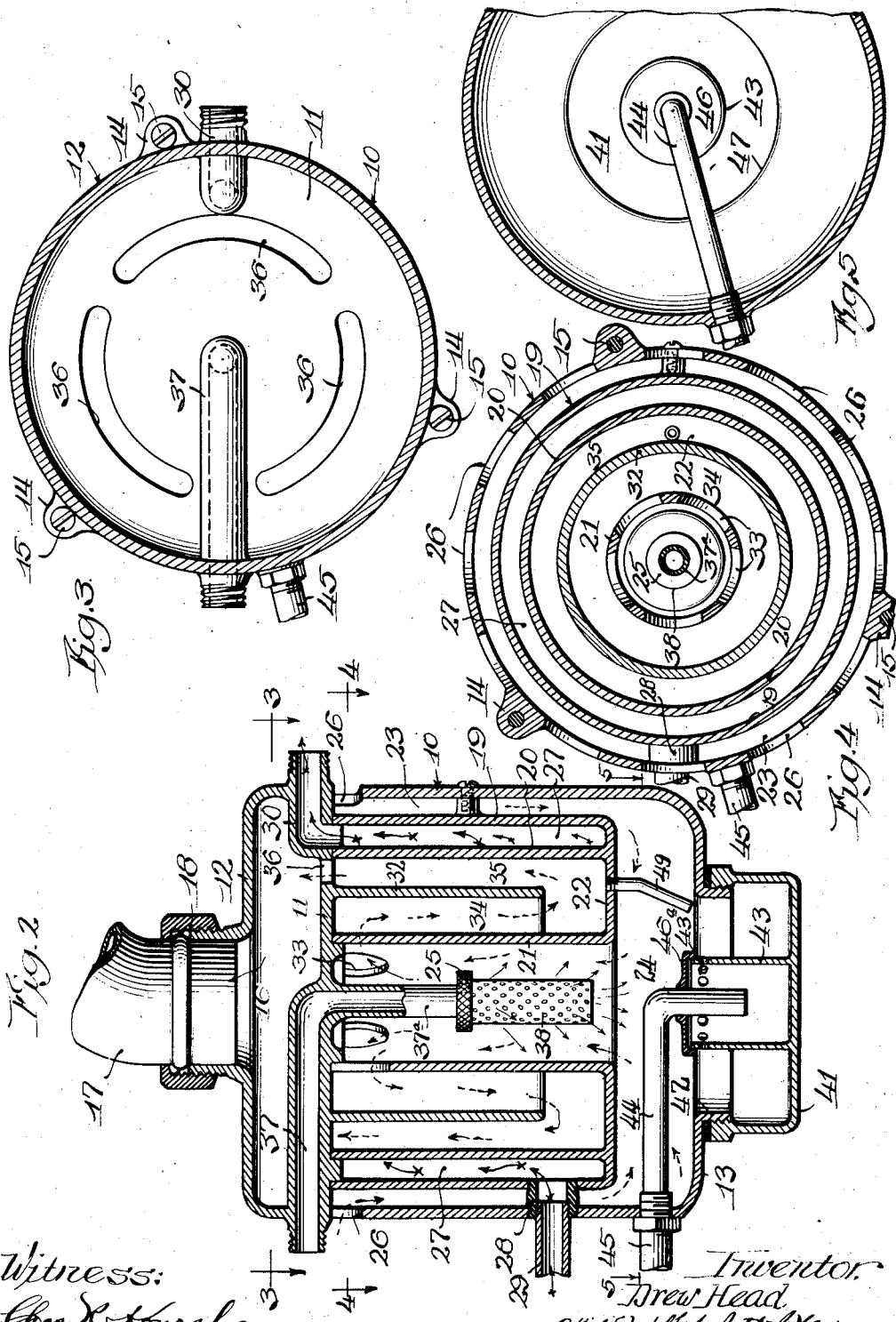

Patented Dec. 18, 1928.

1,695,426

UNITED STATES PATENT OFFICE.

DREW HEAD, OF CHICAGO, ILLINOIS.

AIR CONDITIONER.

Application filed January 3, 1927. Serial No. 158,448.

This invention relates to improvements in air conditioners especially designed for treating the air which is delivered to the carburetor of internal combustion motors.

The object of the invention is to provide a device which is capable of accomplishing what heretofore has necessitated the use of several different devices each functioning independently of the other, namely, the cleaning, heating and moistening of the air delivered to the carburetor of an internal combustion motor.

A further object of the invention is to improve and render more practical the type of device disclosed in a prior application Serial No. 74,225, filed by me on December 9, 1925, the same having somewhat the same general construction and application to a motor, but intended primarily for cleaning the air, although it appeared manifest that the air would also be moistened.

A preferred embodiment of the invention is illustrated in the accompanying drawings, in which Figure 1 is a general view in side elevation of the motor and cooling system of an automobile showing the air conditioning device.

Figure 2 is an enlarged detail view of the device in vertical section.

Figure 3 is a cross-sectional view taken on line 3—3 of Figure 2; and

Figures 4 and 5 are cross-sectional views through other parts of the device, taken on lines 4—4 and 5—5, respectively.

It is a generally recognized fact that the performance of internal combustion motors is improved by heating as well as moistening or humidifying the air drawn into the carburetor, the opinion being that a more effective and homogeneous explosive mixture is thus produced. Likewise, it is recognized as desirable to remove dust particles from the air, to protect the cylinder walls from being scored. Devices for heating the air have long been in use, all utilizing the heat from the exhaust manifold. Air cleaners of various types are also in common use, which separate the dust by centrifugal action or by taking advantage of the inertia of the dust particles in conducting the incoming air through a circuitous passage. Humidifiers have not been altogether practical, due primarily to the problem of supplying the necessary water. Where these devices are used, they invariably function independent of each other, so that the air must pass through one and then another, thus increasing the resistance to the free passage of air to the carburetor. In the present device, however, the air is heated, cleaned and moistened in its passage through a single compact device occupying but a small space in the motor compartment.

Figure 1 shows a typical automobile motor 1 equipped with a carburetor 2 shown in dotted lines, since it is located on the far side of the motor. Being of the water cooled type, the motor has the usual cooling system comprising a radiator 3, a pump 4 connected with the bottom of the radiator through a hose connection 5 and connected with the water-jacket of the motor near the bottom thereof. The water jacket is also connected with the top of the radiator through an upper hose connection 6, thus establishing circulation through the water jacket and radiator in a general upward direction through the former, and a downward direction through the latter. A fan 7 driven by the motor and located immediately behind the radiator, draws the air through the radiator and forces it rearwardly over the motor. The pump 4 is driven through a pump shaft 8 driven by the motor, this being the usual arrangements in a force-feed cooling system, although the pump would be omitted entirely in the so-called thermo-siphon system in which gravity is relied on to promote circulation of the cooling water. On the rear or exhaust side of the motor is the usual exhaust manifold 9, through which the exhaust gases are delivered from the cylinders.

The air conditioning device is shown as mounted on the exhaust side of the motor and near its top. The general shape of the device is cylindric and has the appearance of a casing with various connections leading to the carburetor, cooling system and the exhaust manifold. As clearly shown in Figure 2, the outer casing or shell 10 of the casing encloses a plurality of concentric inner walls spaced apart from each other and forming a corresponding series of concentric annular chambers, some of them being closed at their upper or lower ends, others being connected at one end or the other to form up and down branches of the air passages through the device.

Referring now to the details of construction of the device, the same is preferably made in parts or sections which are fitted together and assembled. Thus the main division or parting line coincides with the bottom of a transverse wall 11 formed integral with the top end wall portion 12, of the outer shell 10, these walls forming a hollow casing fitting over the bowl-like lower section of the outer shell or casing, including a bottom wall portion 13. The two sections are joined together by pairs of lugs 14, 14 spaced apart about the abutting edges of the sections, and fastened by screws 15. Within the hollow top section is formed a chamber 16 communicating directly with the air intake to the carburetor 2 through a pipe 17 extending from an outlet connection 18 at the center of the top wall 12.

Mounted within the lower section of the outer casing 10 is an inner shell consisting of three concentric annular walls 19, 20 and 21, connected at their lower ends by a bottom wall 22 and abutting against the transverse wall 11 at their upper edges. The outermost wall 19 of the inner shell is spaced inwardly from the outer shell 10, thus forming an annular chamber 23, communicating at its lower end with a chamber 24 across the bottom of the casing below the inner shell. This bottom chamber opens into a central vertical passage 25 formed by the inner wall 21. A series of air inlet openings 26 are formed in the outer casing 10 and around the upper end of the annular chamber 23.

Between the wall 19 and next or adjacent wall 20 of the inner shell, is formed a comparatively narrow annular chamber 27 closed at both ends, but having an inlet connection near its bottom, through a short pipe 28 extending across the intervening chamber 23, and inlet pipe 29 tapped into the exhaust manifold 9 of the motor near its head end. At the opposite side of the device and near the top of the chamber 27, is an L-shaped outlet passage 30 connected with a return pipe 31 leading back to the exhaust manifold 9 near its tail end, (Figure 1).

Between the second or intermediate wall 20 and the inner wall 21 of the inner shell, is a somewhat wider annular chamber divided into two branch passages by a depending annular baffle wall 32 integral with the transverse wall 11 and terminating short of the bottom wall 22 of the inner shell to form a connection at the lower ends of the passages on either side of said wall 32. A series of holes 33 at the top of wall 21 connects the inner branch passage 34 with the central passage 25, while the upper end of the outer branch passage 35 communicates with the upper chamber 16 through a series of three arcuate slots 36 formed in the wall 11 (Figure 3).

Extending radially inward just above the wall 11 is an integral passage 37, terminating in a downwardly turned stem 37ª extending axially into the central passage 25. At the end of this stem is a nozzle 38 having a multitude of small openings directed laterally. This tube 37 is connected with a water inlet pipe 39, having an inverted U-shaped bend 39ª (Figure 1) extending above the device and thence downwardly and connected with the water pump 4 on the discharge or pressure side thereof. The inverted U-pipe 39ª in the pipe 39 extends to a height slightly above the normal water level of the cooling system, and which otherwise would be lowered to the height of the nozzle. Moreover, a vent pipe 40 extends from the top of the U-pipe 39ª to the air space at the top of the radiator which acts to break the siphon action created in the U-pipe and interrupts the flow of water, which otherwise might continue after the motor is stopped.

At the bottom of the outer casing is provided a dirt receptacle 41 which screws onto a threaded flange 42 surrounding an opening in the bottom wall 13. At the center of the receptacle is an annular wall 43 forming a well having openings 43ª near its top edge. An L-shaped tube 44 extends a short distance into the well and thence radially through the side wall of the outer casing where it connects with a pipe 45 leading to the cooling system on the suction side of the water pump. A cover plate 46 is mounted at the intake end of the tube 44 and closes the top of the well. A check-valve 47 is located in the pipe 45 adjacent its point of connection with the cooling system (Figure 1). A shut-off valve 48 is placed in the pipe 39 just above the pump 4, so that the circulation through the device can be entirely closed off, if necessary.

Referring now to the operation of the air conditioning device, the path of the air to be supplied to the carburetor will first be traced. Entering the openings 26 around the outside of the casing, the air drawn in by the suction of the motor passes downwardly through the outer passage 23, thence across the bottom chamber 24 to the central passage 25, again changing direction and passing upwardly into the passage and through the screen formed by the multitude of fine streams of water discharged from the nozzle 38, the source of which will be presently pointed out more in detail. The action of the water screen is to thoroughly cleanse the air of dirt and dust, which is absorbed by the water which flows downwardly along the sides of the central passage and into the receptacle 41 at the bottom of the outer casing. The cleansed air passes through the openings 33 at the top of the central passage into the down passage 34 surrounding the central passage 25 and thence upwardly in the passage 35, passing through the slots 36 into the top chamber 16 and finally through the intake pipe 17 into the carburetor.

The air in traversing the circuitous path just traced, with its frequent reversals of direction, together with washing action of the spray of water, undergoes a complete cleansing, the larger dirt particles being thrown out by their inertia during the changes of direction of the air before reaching the water screen, the latter separating the finer particles. Manifestly, some of the water in finely divided form is picked up by the air and evaporated, thus adding the amount of moisture required. However, it is possible that an excess of water may be picked up and carried with the air, in which case it is either thrown out by the sudden reversal of direction as the air enters the down passage 34, or, if an excess of water is still carried on, the final reversal of direction at the bottom of the down passage 34 removes the remaining excess, which finds its way back to the bottom of the casing through a small drain pipe 49 in the bottom wall 22 of the inner shell, and leading to the bottom of the outer casing.

In this way, the cleansing and moistening of the air is accomplished. The heating of the air takes place by contact of the air with the walls of the heating chamber 27 through which the hot gases from the exhaust manifold are circulated by the inlet and exhaust pipes 29 and 31. It will be observed from the location of the heating chamber that the air comes into contact with its heated walls twice in passing through the device; first, as it passes downwardly just after it is drawn into the casing, and second, just before it leaves the casing, namely, in passing upwardly in the passage 35.

As already indicated, the source of the water delivered to the nozzle is the cooling system, the water thereof being forced under the pressure of the pump 4 through the pipe 37 to the nozzle 38. The water from the nozzle 38 flows by gravity into the bottom of the device, which is provided with the removable dirt receptacle or trap 41. Since the water holds a quantity of the dirt in suspension, the well 43 is provided to prevent the dirt-laden water being carried back into the cooling system. Thus as the dirt settles to the bottom of the receptacle 41, the clear water overflows into the well and from thence is drawn through the tube 44 and pipe 45 by the suction on the intake side of the pump.

This action, however, only takes place when the motor is operating, since the check valve 47 closes at the instant the pressure is relieved and thus prevents the water from flowing in the reverse direction in the discharge pipe 45. As already explained, the flow of water through the intake pipe 39 ceases when the motor stops by the breaking of the siphon action in the inverted U-pipe 39ª.

It will thus be seen that a device constructed as herein disclosed, provides a practical and economical solution of the problem of conditioning the air delivered to the carburetor of an internal combustion motor, namely, by utilizing the inertia of the dirt for separating the larger particles, the water from the cooling system for removing the finer particles of dirt and for adding the required amount of moisture, and finally by using the heat from the exhaust gases for raising the temperature of the air.

Having described the structure of the device and the advantages thereof, I claim as my invention:

1. An air conditioning device for internal combustion motors comprising a casing having a plurality of connected chambers therein, forming a circuitous air passage from the atmosphere to the carburetor of said motor and including a central passage through which the air passes in an upward direction, a nozzle arranged axially of said central passage and connected with a source of water supply, a water receptacle below said central passage and connected with said source of water supply, and a heat chamber in said casing intermediate two of said air passages and having inlet and outlet connections with a source of heat from said motor.

2. An air conditioning device for internal combustion motors comprising a cylindric casing having a plurality of concentric walls mounted therein and forming a series of annular chambers connected at their upper and lower ends to form a series of up and down air passages, the endmost passages communicating with the atmosphere and the carburetor of the motor respectively, a spray nozzle mounted in one of the up passages, a pipe leading to said nozzle from the pressure side of the water cooling system of said motor, a receptacle below said nozzle, a pipe leading from said receptacle to the suction side of said cooling system, and means for heating the air during its passage through said casing.

3. An air conditioning device for internal combustion motors comprising a cylindric casing having a plurality of concentric walls mounted therein and forming a series of annular chambers connected at their upper and lower ends to form a series of alternate up and down air passages from the atmosphere to the carburetor of the motor and including a central up passage opening at its lower end into the bottom of said casing, a spray nozzle mounted in the central up passage, a pipe leading to said nozzle from the pressure side of the water cooling system of said motor and having an inverted U-pipe therein extending vertically a predetermined distance above said casing, a relatively small pipe connecting said U-pipe with the atmosphere above the water level in said cooling system, and a return pipe leading from the bottom of said casing to the suction side of said cooling system.

4. An air conditioning device for internal combustion motors comprising a cylindric casing having a plurality of concentric walls mounted therein and forming a series of annular chambers connected at their upper and lower ends to form a series of up and down air passages from the atmosphere to the carburetor of the motor and including a central up passage communicating with the bottom of said casing, and a separate chamber having inlet and outlet connections with the exhaust manifold of said motor, a spray nozzle mounted in the central up passage and adapted to deliver water transversely of said passages, a pipe leading to said nozzle from the pressure side of the water cooling system of said motor, said pipe having an inverted U-bend extending above the casing, a water receptable at the bottom of said casing, a return pipe leading from said receptacle to the suction side of said cooling system, and a check valve below the casing in said return pipe.

5. An air conditioning device for internal combustion motors, comprising a casing having a plurality of concentrically spaced walls connected at their ends to form a circuitous air passage connected at opposite ends with the atmosphere and the carburetor of the motor respectively, and having a central up passage intermediate its ends, a spray nozzle mounted in said central passage and connected with a source of water supply, and a heat chamber formed between two of said concentric walls separate from said air passage and connected with a source of heat from said motor.

6. An air conditioning device for internal combustion motors, comprising a casing having a plurality of concentric walls spaced apart radially and connected at their ends to form a series of successive down and up passages including a central up passage, the endmost passages communicating with the atmosphere and the carburetor of the motor respectively, a spray nozzle mounted in said central passage and provided with openings directed transversely thereof, a source of water supply for said nozzle, and a chamber below said central passage and connected with said source of water supply.

7. An air conditioning device for internal combustion motors comprising a cylindric casing having a plurality of concentric walls spaced apart radially to form a plurality of annular chambers, predetermined of said chambers being connected at their ends to form a series of down and up air passages from the atmosphere to the carburetor of the motor, a nozzle mounted in one of said up passages and connected with the cooling system of said motor, one of said chambers being closed off at its ends and provided with inlet and outlet connections with the exhaust manifold of said motor.

8. An air conditioning device for internal combustion motors comprising a cylindric casing having a series of concentric annular walls forming a plurality of chambers, connected at their ends to form a series of down and up air passages including a central passage, a nozzle mounted in said central passage and connected with a source of water supply from said motor, one of the intermediate air passages on opposite sides of said central passage being closed at its ends and provided with inlet and outlet connections with the exhaust manifold of said motor.

9. An air conditioning device for internal combustion motors comprising a plurality of concentrically spaced walls and end walls forming annular chambers connected at their ends, the outermost chamber communicating with the atmosphere and with the lower end of the innermost chamber, the same being connected at its upper end with an intermediate chamber communicating with the carburetor of said motor, a nozzle mounted in said innermost chamber and connected with a source of water supply, the bottom end wall forming a receptacle below said innermost chamber, and a return pipe leading from said receptacle to said source of water supply.

10. An air conditioning device for internal combustion motors comprising a cylindric casing having a plurality of concentric annular chambers therein, alternately connected at their upper and lower ends to form an air intake from the atmosphere to the carburetor of the motor, and consisting of a series of up and down branches and a central tubular passage intermediate said branches, a nozzle mounted in said passage, a pipe leading to said nozzle from the pressure side of the water cooling system, and a separate chamber intermediate two of said branches on opposite sides of said central passage and having inlet and discharge connections with the exhaust manifold of said motor.

11. An air conditioning device for internal combustion motors, comprising a cylindric casing having a plurality of concentric annular chambers therein and a central tubular passage, the outermost chamber having openings communicating with the atmosphere and connected at its opposite end with the lower end of said central passage, a spray nozzle located in said central passage and connected with a source of water supply, a chamber surrounding said central passage and communicating therewith at its upper end and at its lower end with the carburetor of said motor, and a heat chamber between said first and last mentioned chambers and connected with a source of heat from said motor.

Signed at Chicago, Ill., this 29th day of December, 1926.

DREW HEAD.